United States Patent
Xu et al.

(10) Patent No.: US 12,395,523 B2
(45) Date of Patent: Aug. 19, 2025

(54) INLINE DETECTION OF ENCRYPTED MALICIOUS NETWORK SESSIONS

(71) Applicant: Palo Alto Networks, Inc., Santa Clara, CA (US)

(72) Inventors: Lei Xu, Palo Alto, CA (US); Stefan Achleitner, Arlington, VA (US); Yu Fu, Sunnyvale, CA (US); Shengming Xu, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/650,178

(22) Filed: Apr. 30, 2024

(65) Prior Publication Data

US 2024/0291854 A1  Aug. 29, 2024

Related U.S. Application Data

(63) Continuation of application No. 17/447,064, filed on Sep. 7, 2021, now Pat. No. 11,997,130.

(51) Int. Cl.
*H04L 9/40* (2022.01)
*H04L 65/1069* (2022.01)

(52) U.S. Cl.
CPC ........ *H04L 63/1441* (2013.01); *H04L 63/166* (2013.01); *H04L 65/1069* (2013.01)

(58) Field of Classification Search
CPC ............... H04L 63/1441; H04L 63/166; H04L 65/1069; H04L 63/1416; H04L 63/1466; H04L 63/0428; H04L 63/0245; H04L 63/0227; G06N 20/00
See application file for complete search history.

(56) References Cited

U.S. PATENT DOCUMENTS

| | | | |
|---|---|---|---|
| 2011/0289582 A1 | 11/2011 | Kejriwal et al. | |
| 2018/0124085 A1* | 5/2018 | Frayman | H04L 63/20 |
| 2019/0253435 A1 | 8/2019 | Machlica et al. | |
| 2019/0349403 A1* | 11/2019 | Anderson | H04L 41/0894 |

OTHER PUBLICATIONS

EP Application No. 22194384.8, Extended European Search Report, Jan. 26, 2023, 10 pages.
"Cisco Encrypted Traffic Analytics", Cisco, Feb. 10, 2021, [online], [retrieved on Aug. 1, 2022] Retrieved from the Internet: <https://www.cisco.com/c/en/us/solutions/collateral/enterprise-networks/enterprise-network-security/nb-09-encrytd-traf-anlytcs-wp-cte-en.html>.
Chen, et al., "Rethinking Encrypted Traffic Classification: A Multi-Attribute Associated Fingerprint Approach", IEEE Xplore, 2019 IEEE 27th International Conference on Network Protocols (ICNP), Oct. 31, 2019, 11 pages.

(Continued)

*Primary Examiner* — Amie C. Lin
(74) *Attorney, Agent, or Firm* — Gilliam IP PLLC

(57) ABSTRACT

An inline malicious traffic detector captures handshake messages in a session with a security protocol. The inline malicious traffic detector comprises a classifier that generates a verdict for the session indicating malicious or benign. The classifier is trained on labelled sessions using custom features generated from handshake messages. Based on determining that the session is malicious using features of the handshake messages, the inline malicious traffic detector blocks the session.

20 Claims, 6 Drawing Sheets

(56) References Cited

OTHER PUBLICATIONS

Husak, et al., "HTTPS traffic analysis and client identification using passive SSL/TLS fingerprinting", Springer, EURASIP Journal on Information Security 2016(1), Feb. 2016, 14 pages.

Muehlstein, et al., "Analyzing HTTPS Encrypted Traffic to Identify User's Operating System, Browser and Application", 2017 14th IEEE Annual Consumer Communications & Networking Conference (CCNC), retrieved on May 5, 2021 from https://arxiv.org/vc/arxiv/papers/1603/1603.04865v1.pdf, Jan. 2017, 7 pages.

Pan, et al., "WENC: HTTPS Encrypted Traffic Classification Using Weighted Ensemble Learning and Markov Chain", IEEE Xplore, 2017 IEEE Trustcom/BigDataSE/ICESS, Sep. 11, 2017, pp. 50-57.

* cited by examiner

INLINE DETECTION OF ENCRYPTED MALICIOUS NETWORK SESSIONS

BACKGROUND

The disclosure generally relates to information security and packet filtering.

Transport Layer Security (TLS) and its' predecessor Secure Socket Layer (SSL)—hereinafter both referred to as "TLS"—are communications security protocols that facilitate secure communications over the Internet between peers or applications. TLS is used in a security layer for Hypertext Transfer Protocol Secure (HTTPS) running over Hypertext Transfer Protocol (HTTP) for internet traffic. TLS/SSL handshakes establish a trusted connection between two endpoints that enables encrypted communications. During the handshake, a client-side endpoint provides a set of ciphers/hash functions that a server-side endpoint chooses from, then the server-side endpoint sends a digital certificate (e.g., using a message authentication code (MAC) algorithm) to verify server-side authenticity. Once a consensus cipher or hash function has been communicated and a secure connection is established with the digital certificate, the client and server-side endpoints generate keys using a public-key protocol (e.g., Diffie-Hellman key exchange, pre-shared key) that enable decryption of messages sent during the TLS/SSL session. TLS/SSL functions as a session layer protocol over a transport protocol such as transmission control protocol (TCP). Due to the encryption of the payload for TLS/SSL messages, only the first few fields contain non-encrypted information related to the TLS/SSL session including a server name indication (SNI), a destination internet protocol (IP) address, a selected version of SSL or TLS, etc. The combination of the key-exchange protocol, encryption algorithm, and MAC algorithm are referred to as a "cipher suite."

Domain generation algorithms (DGAs) are algorithms used in command-and-control attacks that generate large sets of randomized domain names that are difficult to block through traditional means such as blacklists. DGAs are used to efficiently generate domain names for large botnets, and it can be difficult to shut down all of the nodes in such botnets because the bots are programmed to only respond to commands that include an encrypted key or authentication certificate. Common deep learning models that are used to detect DGAs with a high rate of accuracy include neural networks with long short-term memory (LSTM) and convolutional neural network (CNN) architectures.

BRIEF DESCRIPTION OF THE DRAWINGS

Aspects of the disclosure may be better understood by referencing the accompanying drawings.

DESCRIPTION

Figure 1:
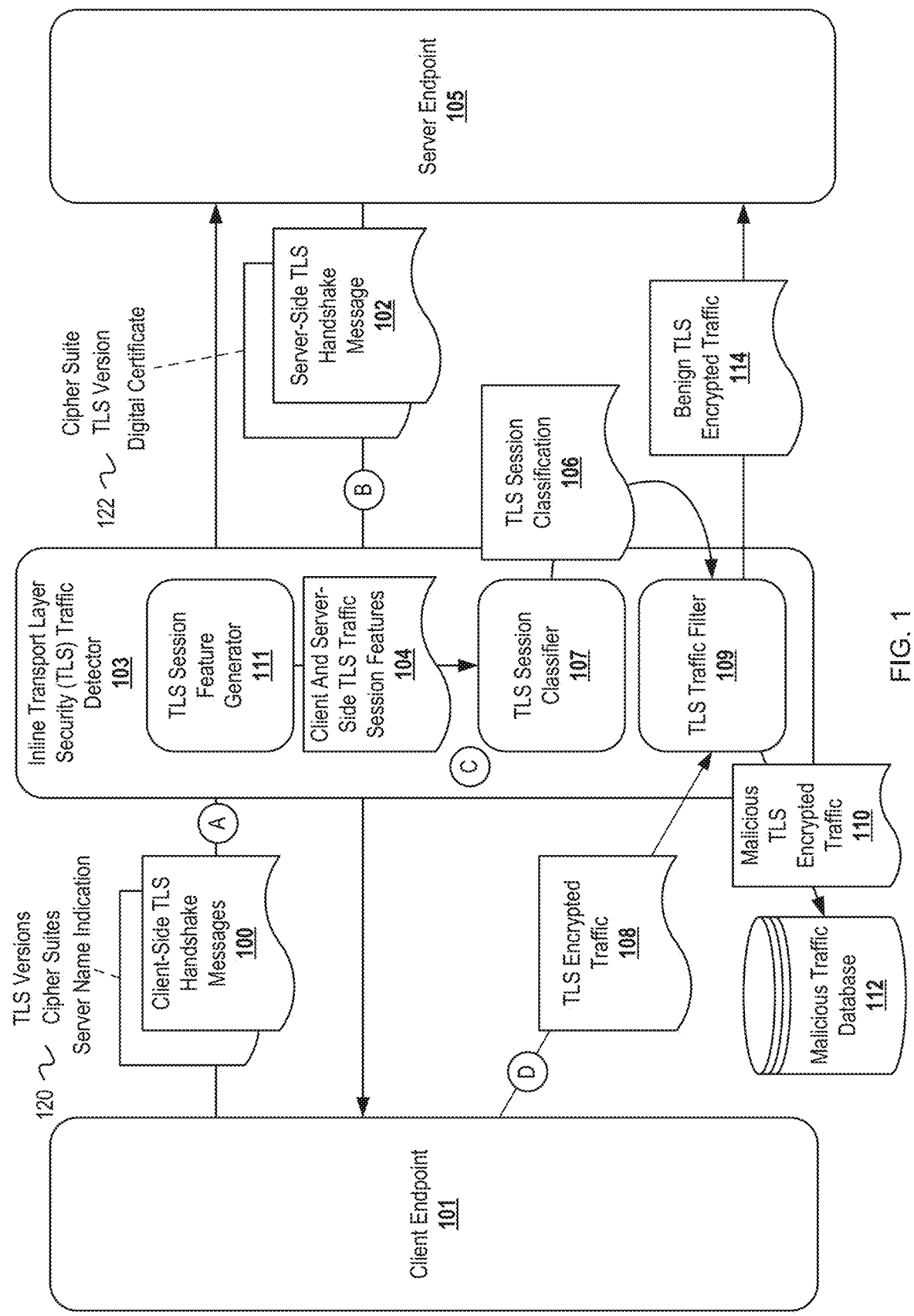
FIG. 1 is a schematic diagram of an example system for inline detection of malicious TLS sessions.

The description that follows includes example systems, methods, techniques, and program flows that embody aspects of the disclosure. However, it is understood that this disclosure may be practiced without these specific details. For instance, this disclosure refers to inline detection of TLS sessions in illustrative examples. Aspects of this disclosure can be instead applied to inline detection of sessions using any security protocol. In other instances, well-known instruction instances, protocols, structures and techniques have not been shown in detail in order not to obfuscate the description.

Overview

Due to the encryption of payloads, TLS traffic can be difficult to filter for malicious behavior. The present disclosure comprises an inline malicious detection system that efficiently classifies and filters TLS sessions prior to communication of potentially malicious encrypted payloads. A comprehensive firewall system generates classifications for TLS sessions using multiple sources of both encrypted and unencrypted data associated with SNIs and destination IP addresses. The classifications of corresponding SNIs and destination IP addresses are labels for TLS sessions in training data for a TLS traffic classifier. The TLS session classifier is trained to detect malicious TLS sessions based on custom features extracted from handshake messages including cipher suites, SNIs, digital certifications, and TLS versions from batches of TLS sessions received by the firewall system. Once trained, the TLS session classifier is deployed inline to receive handshake messages communicated from client- and server-side endpoints and to block malicious encrypted payloads based on malicious classifications of the handshake messages. The TLS session classifier is low-overhead due to the compact feature representation of the handshake messages and can be efficiently trained to predict a small number of features to provide low-latency, efficient updates as labelled TLS sessions are collected by the firewall system. Because the malicious detection occurs in parallel during the handshake stage of a TLS session, this pipeline allows for quickly detecting and blocking traffic from malicious actors over encrypted traffic prior to or soon after communication of malicious encrypted traffic after the handshake stage.

Terminology

"Security protocol"/"encryption protocol"/"cryptographic protocol" all interchangeably refer to a protocol for a security-related functionality that describes how to establish a secure channel of communication. Security protocols can implement key exchange, symmetric and asymmetric encryption, secure data exchange, authentication, etc. Example security protocols include Secure Shell (SSH), Internet Protocol Security (IPsec), Signal Protocol, etc.

A malicious "verdict" refers to a malicious classification by a classifier for session traffic (i.e., network traffic for at least part of a session) using features derived from the session traffic whereas a malicious "flag" refers to a detected abnormality from session traffic that likely corresponds to malicious behavior. A "risk indicator" refers to a verdict, a flag, or a risk assessment for session traffic in a session. Any of the risk indicators can be derived from traffic outside of the session that still relates to or suggests malicious behavior for that session.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Illustrations

FIG. 1 is a schematic diagram of an example system for inline detection of malicious TLS sessions. FIG. 1 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations. Additional operations can be performed between any of the depicted stages and the stages are non-limiting for potential operations during inline detection of malicious TLS sessions.

At stage A, an inline TLS traffic detector 103 captures and stores in memory client-side TLS handshake messages 100 communicated by a client endpoint 101 to a server endpoint 105. The client-side TLS handshake messages 100 include example data fields 120 indicating a list of compatible TLS versions, a list of cipher suites and an SNI. The SNI data field, currently defined in the Internet Engineering Task Force (IETF) Request for Comment (RFC) 6066, indicates one or more hostnames with which client endpoint 101 is attempting to connect. The list of cipher suites comprises multiple compatible key exchange protocols, multiple encryption schema, and multiple MAC algorithms that are compatible with the client endpoint 101. The cipher suites can be updated based on finding vulnerabilities in past cipher suites and improving the algorithms therein. The list of compatible TLS versions can additionally be updated for the client endpoint 101 as newer versions of SSL/TLS are implemented thereon.

At stage B, the server endpoint 105 communicates server-side TLS handshake messages 102 to the client endpoint 101. The inline TLS traffic detector 103 captures the server-side TLS handshake messages 102 at the transport layer and stores corresponding features for malware detection. The server-side TLS handshake messages 102 include example server message data fields 122 indicating a cipher suite, TLS version, and a digital certificate. In this instance, the digital certificate corresponds to a MAC specified by the chosen cipher suite. Moreover, the digital certificate corresponds to an SNI indicated in the client-side TLS handshake messages 100. The digital certificate indicates a public key to be used in an asymmetric encryption scheme (e.g., Diffie-Hellman key exchange) to communicate an encryption key for decryption of TLS encrypted traffic 108. In some instances, the server endpoint 105 can return a compatibility error due to lack of compatibility for the cipher suite or TLS versions indicated in the client-side TLS handshake messages 100. Moreover, the server endpoint 105 can return a domain not found error when no certificate corresponding to the SNI indicated in the client-side TLS handshake messages 100 is present.

The handshake stage of the TLS session depicted in FIG. 1 comprises two stages A and B. This is for simplicity in the example provided. Typical TLS handshakes comprise additional steps to enable secure client/server communications as specified by a handshake protocol. The handshake protocol is a subset of the TLS protocol that specifies the order and format of handshake messages. As an example, after stages A and B, the client endpoint 101 can verify a digital certificate in the server-side TLS handshake messages 102 and can generate a master key to be used to decrypt the TLS encrypted traffic 108. The server endpoint 105 can then receive the encrypted master key that it decrypts with a private key according to the asymmetric encryption scheme. Subsequently, the client endpoint 101 can communicate a confirmation message encrypted with the master key according to an (symmetric) encryption scheme specified by the cipher suite to the server endpoint 105 indicating commencement of transmission of the TLS encrypted traffic 108. After stages A and B, the client endpoint 101 then encrypts the TLS encrypted traffic 108 with the public key and the server endpoint decrypts the TLS encrypted traffic 108 with the unencrypted master key. Because the additional steps described in this example do not contain additional features of the TLS session besides encryption keys and confirmation messages, the inline TLS traffic detector 103 can allow subsequent client/server communications in the handshake stage subsequent to stages A and B without capturing communications.

At stage C, the inline TLS traffic detector 103 determines whether the TLS session between the client endpoint 101 and the server endpoint 105 is malicious. A TLS session feature generator 111 extracts features from the captured TLS handshake messages comprising the client-side TLS handshake messages 100 and the server-side TLS handshake messages 102 to generate client and server-side TLS session features 104. Examples of the client and server-side TLS session features 104 comprise a type of destination port, a number of compatible cipher suites, a number of client extensions, a number of allowable TLS versions, a chosen cipher suite, a chosen TLS version, and characteristics of a digital certificate including number of validity days, number of active days, and number of alternative hostnames when the digital certificate is a Subject Alternate Name (SAN) certificate (i.e., a single digital certificate that spans multiple hostnames).

The inline TLS traffic detector 103 can comprise a DGA detector (not pictured) that determines whether a SNI in the client-side TLS handshake messages 100 and/or digital certificate in the server-side TLS handshake messages 102 are generated with a DGA. The DGA detector can be an unsupervised clustering model, a deep learning model with a long-short term memory architecture, a convolutional neural network architecture, a word embedding architecture, etc. trained on known DGA-generated SNIs and digital certificates. The DGA detector can generate features to include in the client and server-side TLS session features 104 such as indications of whether DGA was detected, the DGA-generated strings, an issuer/subject Common Name of the digital certificate, etc.

A TLS session classifier 107 receives the client and server-side TLS session features 104 and generates a TLS session classification 106 that it communicates to a TLS traffic filter 109. The TLS session classification 106 indicates whether the TLS session between the client endpoint 101 and the server endpoint 105 is malicious or benign. The TLS session classifier 107 can be any classification algorithm designed to efficiently generate verdicts of maliciousness such as a random forest, a neural network, a support vector machine, etc. The architecture of the TLS session classifier 107 can depend on the number of features in the client and server-side TLS session features 104 (e.g., more features can beget more internal classifier parameters).

At stage D, the TLS traffic filter 109 receives TLS encrypted traffic 108 from the client endpoint 101 subsequent to the handshake stage of the TLS session between the client endpoint 101 and the server endpoint 105. If the TLS session classification 106 indicates a malicious TLS session, then the TLS traffic filter 109 blocks all communications between the client endpoint 101 and the server endpoint 105 and forwards all received malicious TLS encrypted traffic 110 to a malicious traffic database 112. Otherwise, the TLS traffic filter 109 communicates all benign classified traffic in the TLS encrypted traffic 108 as benign TLS encrypted traffic 114 to the server endpoint 105. The TLS traffic filter 109 can communicate an alert to the client endpoint 101 and/or the server endpoint 105 in response to the TLS session classification 106 indicating a malicious TLS session. The alert can comprise an indicator that the session is malicious or that the session is blocked. The alert can be according to the alert protocol for TLS so that the client endpoint 101 and/or server endpoint 105 can correctly process the alert during a TLS session. TLS traffic stored in the malicious traffic database 112 can be used to update training and/or testing data sets for the inline TLS traffic detector 103 and new versions of the inline TLS traffic detector 103 can be implemented once a training update is performed using new batches of malicious traffic.

The operations at stage C and stage D can occur in parallel so as to not unnecessarily block TLS traffic and allow low latency inline detection of malicious TLS traffic. The TLS traffic filter 109 can allow traffic flow from the client endpoint 101 and the server endpoint 105 after the handshake stage until the TLS session classifier 107 makes a classification. As such, the inline TLS traffic detector 103 maintains efficiency of the original TLS protocol with the overhead comprising storing handshake messages in memory as they are passed between the client endpoint 101 and the server endpoint 105, generating features from the handshake messages, and inputting the handshake messages into a trained classifier. Moreover, because traffic is classified as the handshake stage occurs, malicious encrypted traffic can be blocked prior to or shortly after malicious traffic is communicated between the client endpoint 101 and the server endpoint 105.

Figure 2:
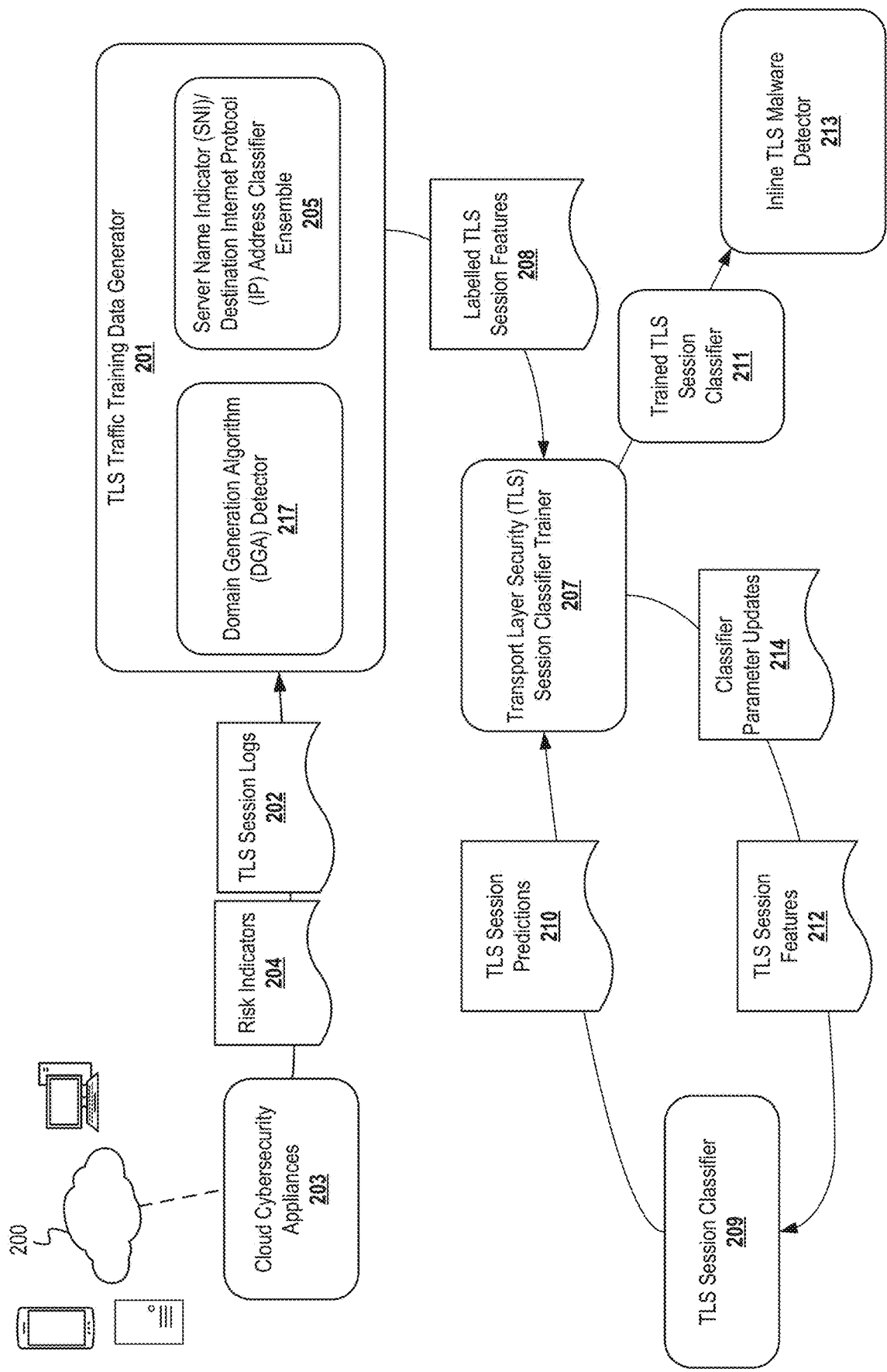
FIG. 2 is a schematic diagram of an example system for training a TLS session classifier for inline detection of malicious TLS sessions.

FIG. 2 is a schematic diagram of an example system for training a TLS session classifier for inline detection of malicious TLS sessions. Cloud cybersecurity appliances 203 collect TLS session logs 202 from traffic over a cloud 200 and communicate the TLS session logs 202 to a TLS traffic training data generator 201. The cloud cybersecurity appliances 203 additionally generate risk indicators 204 for the TLS session logs 202. The cloud 200 includes endpoints such as mobile devices, web servers, personal computers, etc. that can run communications across the World Wide Web and/or local networks using various protocols that are captured by the cloud cybersecurity appliances 203. The cloud 200 can further include decentralized computing resources running across endpoints that are hosted by a web server on the cloud 200 that manages application programming interface (API) calls to the decentralized computing resources and allocates endpoints accordingly. Any of the security protocols disclosed herein can be applied to data encryption prior to cloud storage and encrypted cloud computations (e.g., encrypted cloud computing).

The TLS session logs 202 comprise TLS traffic extracted by the cloud cybersecurity appliances 203 across a wide range of traffic both between endpoints in the cloud 200 and in communication with the World Wide Web (e.g., via a web server hosted on the cloud 200). The TLS traffic can be a subset of traffic on the cloud 200 including both encrypted and unencrypted traffic of various protocols. The cloud cybersecurity appliances 203 are trained to detect malicious activity in traffic based on traffic for multiple communication protocols not limited to TLS traffic.

The cloud cybersecurity appliances 203 comprise multiple firewalls that each analyze a different layer, scope, type, representation, etc. of traffic. Each firewall can take as input features from any number of data sources that can range from inline network traffic, server diagnostics, application metrics, etc. and can generate malicious verdicts, risk assessments, and malicious flags independent of other firewalls. To exemplify, a first firewall running on the cloud cybersecurity appliances 203 can read unencrypted traffic and classify traffic communicated to destination IP addresses and SNIs as malicious or benign based on comparing features of the unencrypted traffic with signatures for known malware. A second firewall running on the cloud cybersecurity appliances 203 can track application metrics across the cloud 200 and can identify outlier behavior (e.g., overloaded computation times for processes) to determine probable malicious application behavior is occurring and can further generate a malicious flag indicating that the outlier behavior may be malicious. A third firewall can identify operational characteristics such as importance levels for servers, applications, resource centers, etc. related to traffic and can generate a risk assessment indicating importance of the operational characteristics. The risk indicators 204 comprise any of the aforementioned malicious flags, malicious verdicts, and risk assessments that are generated by firewalls on the cloud cybersecurity appliances 203. The risk indicators 204 can contain indications of scope (e.g., corresponding applications, endpoints, destinations, etc.) in memory and can indicate corresponding TLS sessions in the TLS session logs 202.

The TLS traffic training data generator 201 receives the risk indicators 204 and the TLS session logs 202 from the cloud cybersecurity appliances 203. The TLS traffic training data generator 201 comprises a DGA detector 217 and an SNI/IP address classifier ensemble 205. The SNI/IP address classifier ensemble 205 uses the risk indicators 204 to generate labels for each session in the TLS session logs 202. For instance, the SNI/IP address classifier ensemble 205 can assign a malware label to a TLS session if any malware verdicts in the risk indicators 204 are positive and if more than 5 malicious flags occur in the risk indicators 204. Alternatively, the risk indicators 204 can comprise indications of whether corresponding sessions are malicious, and the cloud cybersecurity appliances can make this determination based on the aforementioned malware verdicts, malicious flags, etc. These labels are combined with features generated by the DGA detector 217 and the TLS traffic training data generator 201 into labelled TLS session features 208. The DGA detector 217 determines whether, for each session in the TLS session logs 202, the TLS session has a DNI that was generated by a DGA (to a sufficient certainty). A feature for the TLS session can be an indicator that a domain name in the TLS session was generated by a DGA or the domain name generated by a DGA. The TLS traffic training data generator 201 further generates features from the TLS session logs 202. These features can comprise both client and server-side features and are equivalent to the features to be used by an inline TLS malware detector 213 (thus, should be efficiently computable). Example features include cipher suite, certification, and destination port-based features as described above with respect to FIG. 1. The TLS traffic training data generator 201 communicates the generated features in the labelled TLS session features 208 to a TLS session classifier trainer 207.

The TLS session classifier trainer 207 initializes a TLS session classifier 209. The TLS session classifier 209 can be any classification model that is able to accurately and efficiently classify TLS sessions based on features in the labelled TLS session features 208. For instance, the TLS session classifier 209 can be a support vector machine, a random forest classifier, a linear regression classifier, a neural network classifier, etc. The architecture of the model should depend on the amount of available training/testing data in the labelled TLS session features 208, the desired efficiency of the inline TLS malware detector 213, and the complexity/number of features in the labelled TLS session features 208. A large amount of training/testing data and complexity/number of features is conducive to a more complex model, at the cost of a lower efficiency for the inline TLS malware detector 213. These operational considerations can depend on the domain of malware classification and can be determined by an expert compensating for logistical considerations.

The TLS session classifier trainer 207 iteratively provides TLS traffic features 212 and classifier parameter updates 214 to the TLS session classifier 209 and the TLS session classifier 209 responds, at each iteration, with TLS session predictions 210. The TLS session predictions 210 indicate whether TLS sessions in the TLS traffic features 212 are malicious or benign. The TLS session classifier trainer 207 generates classifier parameter updates 214 based on a comparison between the TLS session predictions 210 and labels for each TLS session in the labelled TLS session features 208. The classifier parameter updates 214 are typically computed using a loss function between the TLS session predictions 210 and corresponding ground truth labels in the labelled TLS session features 208, where the loss function depends on a type of classifier for the TLS session classifier 209.

The TLS session classifier trainer 207 completes training iterations for the TLS session classifier 209 until training criteria are satisfied. For instance, the training criteria can be that a sufficient number of training iterations has occurred, that a loss function for the TLS session classifier 209 is sufficiently small, etc. Additionally, the labelled TLS session features 208 can comprise a testing set not used during training of the TLS session classifier 209, and the training criteria can include that generalization error on the testing set is sufficiently small. Once the training criteria are satisfied, the TLS session classifier trainer 207 communicates a trained TLS session classifier 211 to the inline TLS malware detector 213.

The features depicted herein for training a TLS session classifier and classifying TLS sessions relate to metadata in handshake messages for TLS traffic. Any of the feature generation, classification training, and malicious traffic detection operations can be performed for other types of encrypted and unencrypted traffic. Features can be generated from any data or metadata contained in traffic for relevant protocols. For instance, features can be generated from client-server handshakes for any cryptographic protocol. Any unsupervised or supervised learning model can be implemented for inline traffic detection. The architecture and choice of classifier can depend on the type and volume of traffic being classified. The classification depicted herein is for malicious TLS traffic. In other embodiments, traffic classification can correspond to any of traffic to be blocked based on any security policy that does not necessarily correspond to malicious traffic. For instance, traffic from certain benign sources and/or actors can be on a block list in a security policy, and a traffic classifier can be trained to detect traffic from the sources and/or actors on the block list (both client- and server-side). Alternative to indicating malicious traffic, a verdict by a TLS traffic classifier can indicate traffic for blocking according to any of the aforementioned criteria.

Figure 3:
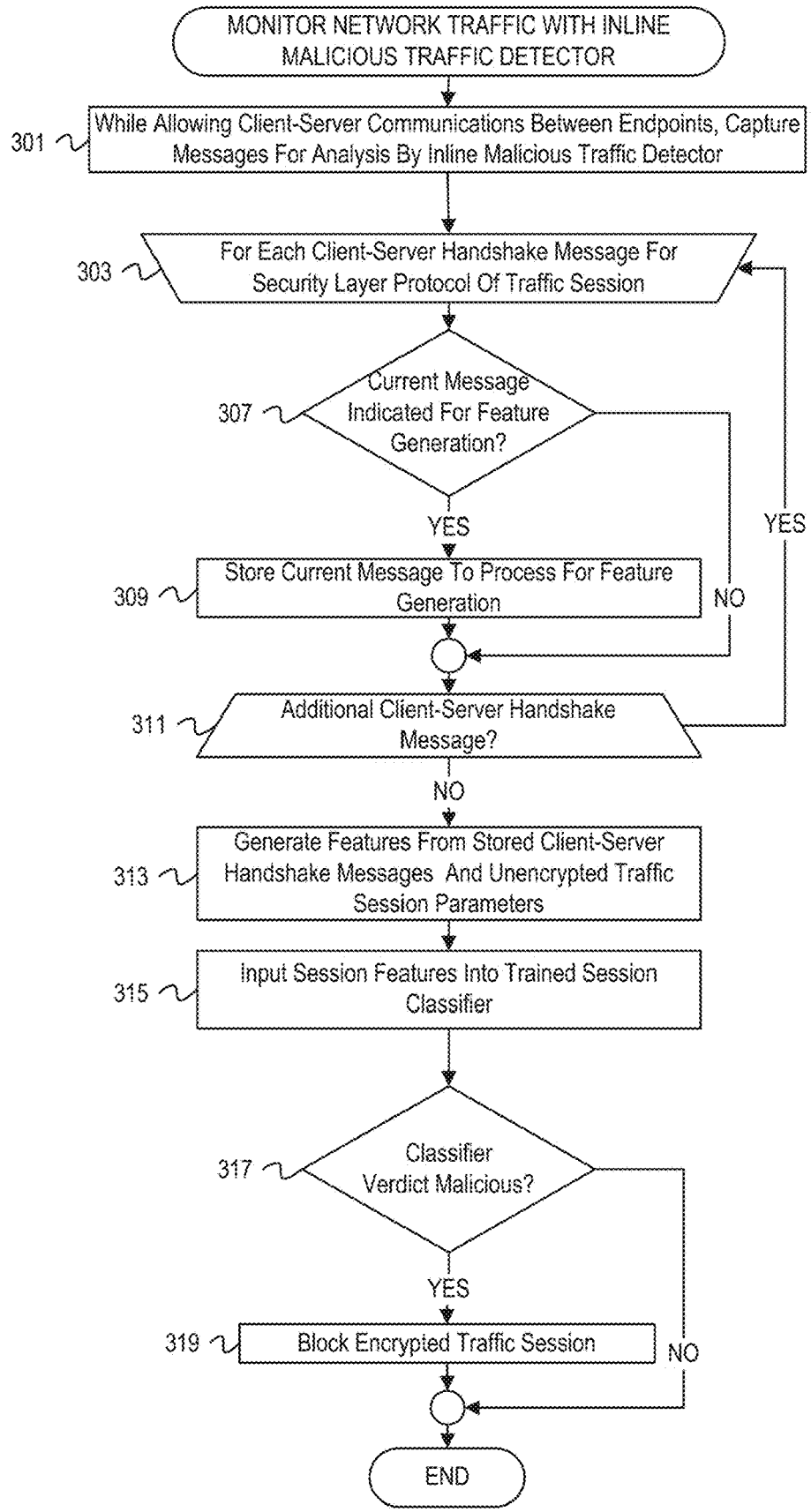
FIG. 3 is a flowchart of example operations for blocking an encrypted session with an inline malicious traffic detector.
Figure 4:
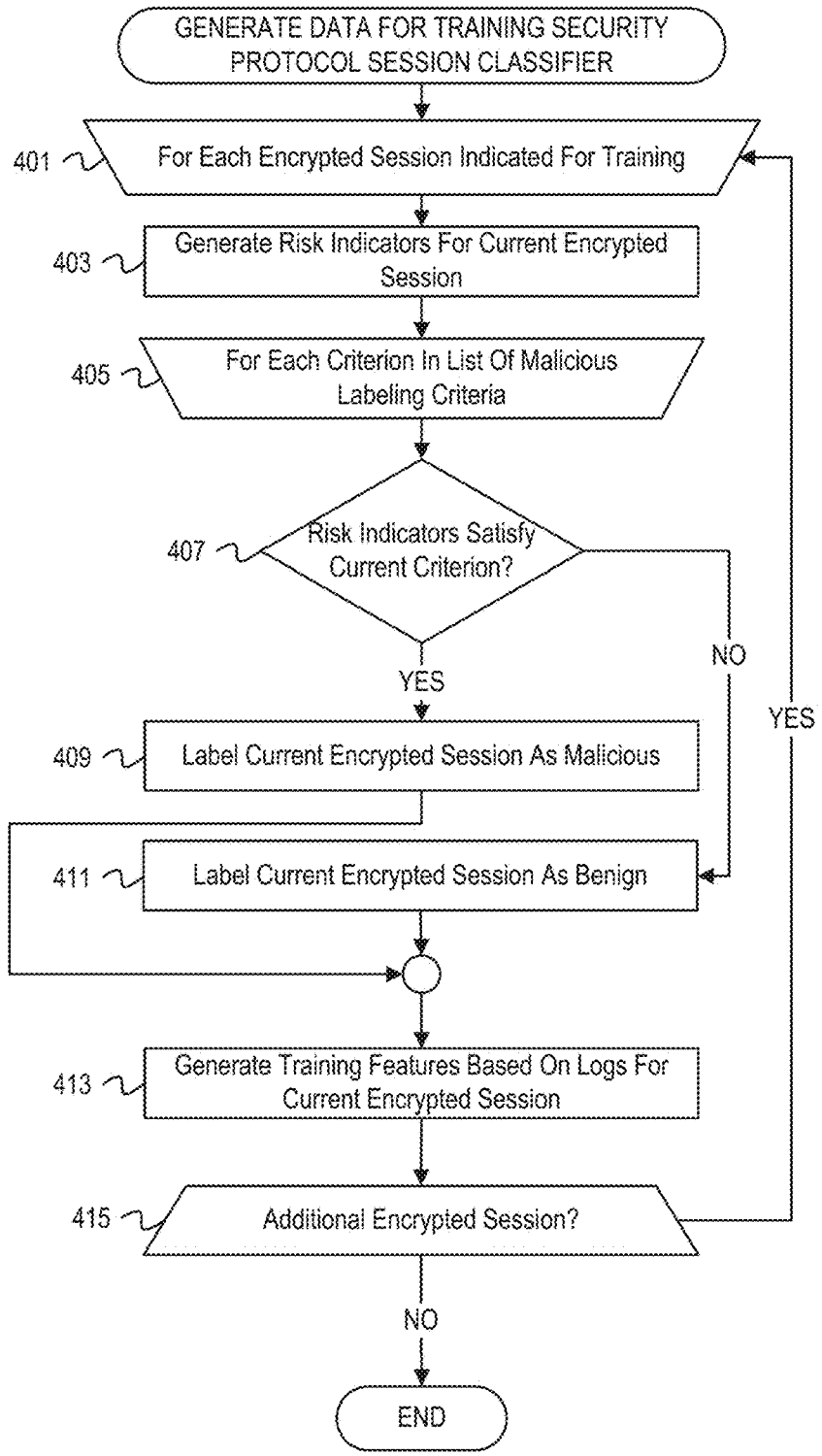
FIG. 4 is a flowchart of example operations for generating data for training a security protocol session classifier.
Figure 5:
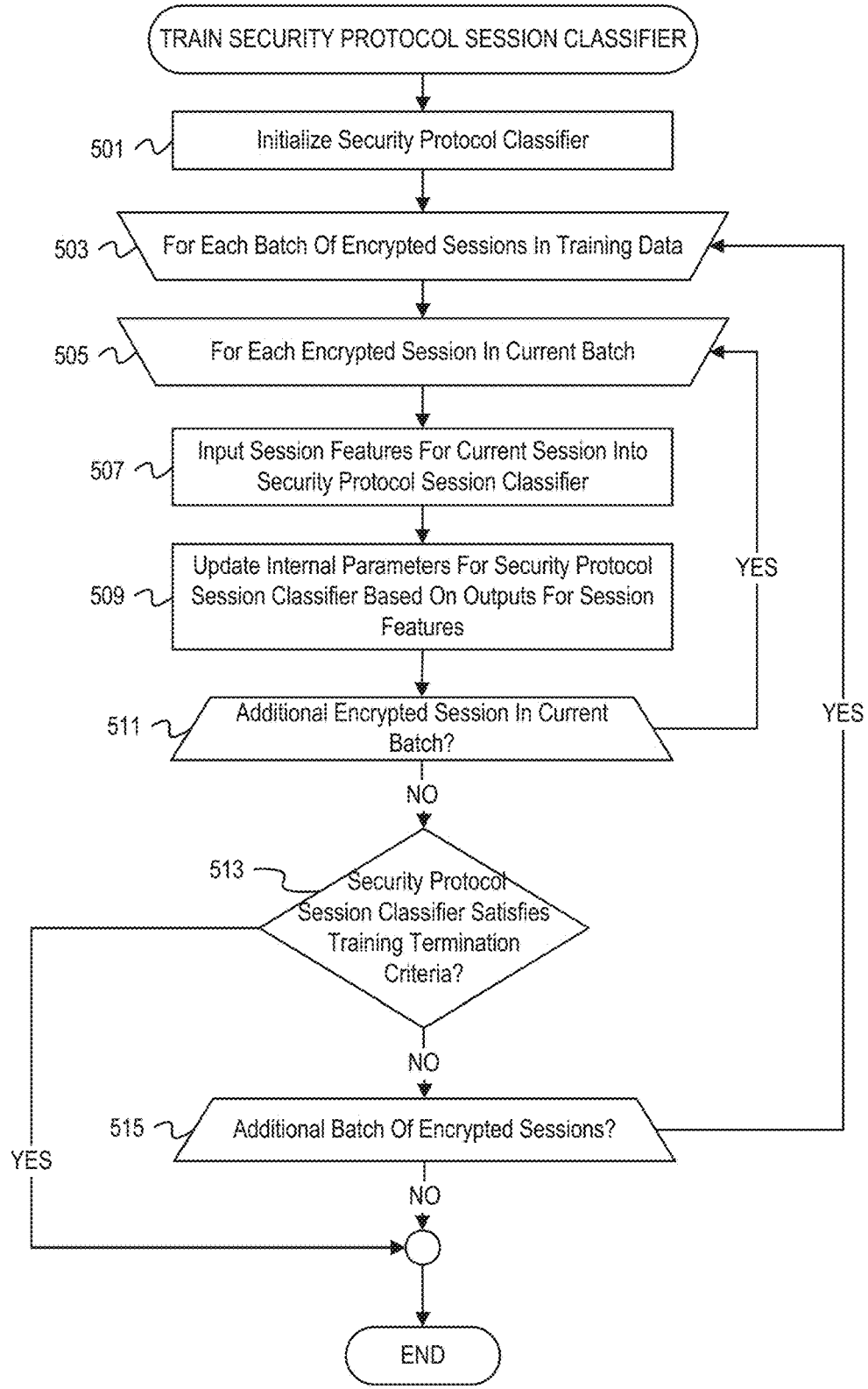
FIG. 5 is a flowchart of example operations for training a security protocol session classifier.

FIGS. 3-5 are flowcharts of example operations related to inline malicious traffic detection with classifiers and to training of a classifier to efficiently detect malicious traffic inline. The example operations are described with reference to a client endpoint, an inline malicious traffic detector, a training data generator, a security protocol session classifier, and a security protocol session classifier trainer for consistency with the earlier Figure(s). The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for monitoring network traffic with an inline malicious traffic detector. At block 301, an inline malicious traffic detector captures messages for analysis while allowing, in parallel, uninterrupted client-server communications between endpoints. The depicted example is for efficiency and low latency of client/server communications and the inline malicious traffic detector captures packets in messages at the transport layer before communicating them to the client/server endpoints. Because of the efficient generation of features of the encrypted session as handshake messages received at the transport layer without overhead to go up and down the network stack, the inline malicious traffic detector can block the encrypted session prior to malicious cryptographic communications. Other embodiments, such as blocking all client/server traffic after a handshake and until a session verdict is determined or pushing messages up from the transport layer to the application layer for feature generation are possible. Additionally, the inline malicious traffic detector can determine to block traffic at any point during the feature generation and session classification steps (e.g., when a DGA detector determines that a destination IP address or SNI is generated by a DGA).

At block 303, the inline malicious traffic detector begins iterating through client-server handshake messages that establish a session according to a security protocol for the session. In some embodiments, the inline malicious traffic detector can receive packets for a client-server handshake message at the transport layer and, based on the type of handshake message as defined by the security protocol, can determine that the current handshake message is the final handshake message for feature generation. In these embodiments, iterations after the final handshake message are skipped and classification of the encrypted session occurs in parallel to client/server communication of subsequent handshake messages not used for feature generation. For instance, the inline malicious traffic detector can use the first message communicated by the client and the first message communicated by the server after establishing a session connection for feature generation and can skip iterations for all later handshake messages. In a firewall environment where the inline malicious traffic detector receives transport layer packets communicated across multiple pairs of endpoints, the inline malicious traffic detector can maintain a list of pairs of endpoints with active sessions. Sessions for client endpoint/server endpoint pairs can be tracked using metadata contained in session packets such as source IP address, source port number, destination IP address, destination port number, and protocol type. Packets having all of these attributes in common can be grouped in a same session and the tuple of attributes can be added to a list of active sessions. Tuples for sessions can be removed from the list of active sessions once a finished message (according to the corresponding protocol) is received. The inline malicious traffic detector can then track generated features and/or previously seen message types for each tuple of attributes to determine whether to continue to store and generate features from additional handshake messages. The example iterations occur at blocks 307 and 309.

At block 307, the inline malicious traffic detector determines whether the current client-server handshake message is indicated for feature generation. The current message is structured based on its' order in the handshake messages according to the handshake protocol. The inline malicious traffic detector extracts TCP and IP headers from the current client/server handshake message, as well as the handshake payload according to the security protocol if present. The inline malicious traffic detector can have an ordering of handshake messages indicated for feature generation according to the handshake protocol. For instance, the inline malicious traffic detector can comprise instructions to capture and store only the first and second handshake message that, according to the handshake protocol for TLS, are ClientHello and ServerHello messages used to establish a cipher suite to be used for encryption and decryption of application traffic. In other embodiments, the inline malicious traffic detector can comprise a hard coded set of rules for ordering of handshake message types according to fields in the TCP and IP headers.

Handshake message types as well as the TLS/SSL protocol can be inferred from information in the handshake messages and information in the TCP header. TCP payloads can be verified to have a particular version and message type, and TCP headers can indicate additional protocol information such as destinations ports. Extensions specify padding and additional fields to be included in future messages that affect whether each message is included for feature generation. Alternatively, the inline malicious traffic detector can read a handshake message type field as defined by the TLS protocol and can have an index of handshake message types indicated for feature generation. Because the first field according to the TLS protocol is a handshake message type, the inline malicious traffic detector can verify the handshake message type against approved handshake message types for feature generation (e.g., client_hello, server_hello, encrypted_extensions, certificate, etc.) by only reading the first few bits of the message at the transport layer before passing it or storing the remainder for feature generation. If the current message is indicated for feature generation, flow proceeds to block 309. Otherwise, flow skips to block 311.

At block 309, the inline malicious traffic detector stores the current message or extracted parts of the current message to later process for feature generation. The inline malicious traffic detector can parse the current message to extract the relevant data for feature generation according to the handshake protocol. For instance, key exchange messages have bits reserved for a random string. The inline malicious traffic detector can remove these bits from key exchange messages before storage in local memory. Extraneous fields and also desired fields can be specified by extension fields in handshake messages according to a security protocol. The extensions specify the format and content of allocated bits in future protocol messages. Based on extensions specified in previous iterations, the inline malicious traffic detector can choose to include or omit allocated bits from the current message. In some embodiments, the inline malicious traffic detector immediately generates features for the current message before communicating the message to its' destination and instead stores the features in memory. Depending on the architecture of the inline malicious traffic detector, features and/or messages can be input directly into a trained session classifier as they are communicated and received by the inline malicious traffic detector during the client-server handshake to reduce memory overhead.

At block 311, the inline malicious traffic detector determines whether there is an additional client-server handshake message. For instance, the inline malicious traffic detector can determine that the current client-server handshake message is a Finished message from the client indicating the end of the handshake protocol messages and beginning of an application protocol. If there is an additional client-server handshake message, flow returns to block 303. Otherwise, flow proceeds to block 313.

At block 313, the inline malicious traffic detector generates features from the stored client-server handshakes and unencrypted session parameters. The unencrypted session parameters can be indicated in, for instance, messages communicated while establishing the session connection such as a host name and a port number. The features can be any features that correspond to inputs for a trained session classifier. The inline malicious traffic detector can convert strings in the client-server handshake messages to numerical features and can perform preprocessing/normalization on features. Although feature generation is depicted as occurring at block 313 outside of the iterations at blocks 303, 307, 309, and 311, in some embodiments feature generation can occur in parallel to communication of client-server handshake messages.

At block 315, the inline malicious traffic detector inputs the session features into a trained session classifier. The trained session classifier is trained on features for handshake messages of encrypted sessions previously communicated across a same or related network. The trained session classifier can be any supervised learning model such as a random forest classifier, a support vector machine, a neural network, etc. that outputs verdicts (e.g., malicious/benign labels) for encrypted sessions.

At block 317, the inline malicious traffic detector determines whether the classifier verdict indicates that the encrypted session is malicious. In some embodiments, the classifier verdict can indicate that the encrypted session is incorrect, unnecessary, or any other classification that indicates blocking is to be done. The trained session classifier can be trained to output multiple classifications that correspond to blocking traffic. Alternatively, the trained session classifier can output a binary indicator of whether to block traffic. If the classifier verdict is malicious or indicates blocking, flow proceeds to block 319. Otherwise, the inline malicious traffic detector allows subsequent communications in the encrypted session.

At block 319, the inline malicious traffic detector blocks the encrypted session. In some embodiments, the inline malicious traffic detector can communicate alert messages to both the client and server indicating termination of the encrypted session. The alert messages can indicate a reason for session termination (e.g., malicious traffic source) and are formatted according to the alert protocol for TLS. The operations in FIG. 3 are complete.

FIG. 4 is a flowchart of example operations for generating data for training a security protocol session classifier. At block 401, a training data generator begins iterating through encrypted sessions indicated for training. The encrypted sessions can be indicated for training as corresponding to one or more networks for which an inline malicious traffic detector implementing a trained security protocol session classifier will be deployed. The encrypted sessions can be stored by a firewall system to be used for various analytics including training a security protocol session classifier. The firewall system can maintain various other metrics and data related to client and server endpoints for the encrypted sessions such as application metrics, device performance metrics, cloud metrics, session logs, fingerprints for malicious actors, application fingerprints, etc. that can all be used for classifying training data. The example operations at each iteration occur at blocks 403, 405, 407, 409, 411, and 413.

At block 403, the firewall system generates risk indicators for the current encrypted session. The firewall system comprises one or more firewalls that generate flags, verdicts, and assessments based on data in the current encrypted session and data stored by the firewall system related to parameters in the current encrypted session. For instance, the firewall system can have behavioral data stored for a client-side and server-side IP address for the current encrypted session. A first firewall on the firewall system can evaluate risk related to both IP addresses to generate a risk assessment indicating a level of severity for exposure of the corresponding IP address. A second firewall can determine that a server IP address is a frequent target for malicious attacks using the encryption protocol of the current encrypted session and can generate a flag indicating the possibility of malicious activity. A third firewall can comprise a machine learning classifier trained on encrypted traffic that generates a malicious or benign verdict based on, for instance, statistics of time stamps for messages in the current encrypted session. Multiple flags, verdicts, and assessments can be computed by one or more firewalls on the firewall system. Different firewalls can have access to different data of varying scopes related to the current encrypted session allowing for a wider breadth of risk indicators.

At block 405, the training data generator begins iterating through criteria in a list of malicious labeling criteria. The example operations at each iteration occur at blocks 407, 409, 411, and 413.

At block 407, the training data generator determines whether the risk indicators satisfy the current malicious labeling criterion. The criterion can be that there is a number of flags above a threshold number of flags contained in the risk indicators, that there is a malicious verdict in the risk indicators, etc. The criterion can combine criteria for flags, verdicts and assessments. For instance, for an encrypted session with a high-risk assessment, the criterion can require a lower number of malicious flags in the risk indicators (e.g., 3) in comparison to an encrypted session with a low-risk assessment requiring a higher number of malicious flags (e.g., 5). The criterion can further be restricted to risk indicators generated by firewalls operating on separate data sources. For instance, risk indicators generated by a firewall operating on application metrics can have separate criteria than risk indicators generated by a firewall operating on raw session logs. If the current criterion is satisfied, flow proceeds to block 409. Otherwise, flow skips to block 411.

At block 409, the training data generator labels the current encrypted session as malicious. The label can comprise other descriptors for the current encrypted session such as erroneous, incorrect, blocked, etc. The descriptor can depend on risk indicators generated by the firewall system. For instance, a firewall on the firewall system can determine that a client-side IP address is on a block list and the training data generator can label the current encrypted session as blocked.

At block 411, the training data generator labels the current encrypted session as benign. The label can comprise a binary indicator (e.g., 0) that the current encrypted session is benign. In other embodiments, the label can comprise a descriptor for the current encrypted session. For instance, the label can be an allowed descriptor.

At block 413, the training data generator generates training features based on logs for the current encrypted session. The training data generator generates training features from unencrypted data messages and client-server handshake messages in the logs. For instance, the training features can comprise TLS versions, types of cipher suites, types of destination ports, types of digital certificates, etc. The training features further depend on the encryption protocol used for the current encrypted session and the architecture of a security protocol session classifier. Training features can be preprocessed and normalized for inputting into the encrypted session classifier.

At block 415, the training data generator determines whether there is an additional encrypted session. If there is an additional encrypted session indicated for training, flow returns to block 401. Otherwise, the operations in FIG. 4 are complete.

FIG. 5 is a flowchart of example operations for training a security protocol layer session classifier. At block 501, a security protocol session classifier trainer initializes a security protocol session classifier. The initialization for the classifier depends on the type of classifier and the architecture of the classifier. Certain classifiers can be initialized with a random seed (e.g., neural networks, supervised clustering algorithms).

At block 503, the security protocol session classifier trainer begins iterating through batches of encrypted sessions in training data, wherein the sessions are encrypted according to an encryption schema defined by the security protocol. The training data comprises inputs (i.e., features) to the classifier and corresponding labels. The batch size can be based on the type of classifier and, in some embodiments, training occurs across all training data without batches. Batches can be sampled uniformly at random from the training data to avoid bias. The example operations at each iteration occur at blocks 505, 507, 509, 511, and 513.

At block 505, the security protocol session classifier trainer begins iterating through encrypted sessions in the current batch of training data. The example operations at each iteration occur at blocks 507 and 509.

At block 507, the security protocol session classifier trainer inputs session features for the current session into the security protocol session classifier. The security protocol session classifier generates an output indicating a classification for the current session. For instance, the security protocol session classifier can indicate the current session is benign, malicious, allowable, blocked, etc. In some embodiments the indicator can be a number associated with each of these classifications.

At block 509, the security protocol session classifier trainer updates internal parameters of the security protocol session classifier based on outputs for the session features. For instance, the security protocol session classifier trainer can compute a loss function between the output of the security protocol session classifier and the corresponding label for the current encrypted session (i.e., the ground truth) and can update the internal parameters based on the value of the loss function. The updates for the internal parameters depend on model architecture and type for the security protocol session classifier. In some embodiments, internal parameters are also updated across batches (e.g., after block 511), for instance, with bootstrap aggregating.

At block 511, the security protocol session classifier trainer determines whether there is an additional encrypted session in the current batch. If there is an additional session, flow returns to block 505. Otherwise, flow proceeds to block 513.

At block 513, the session classifier trainer determines whether the security protocol session classifier satisfies one or more training termination criteria. The training termination criteria can be that a threshold number of iterations has occurred, that an average loss on training data (training error) is below a threshold loss, that an average loss on testing data (generalization error) is below a threshold loss, any combination thereof, etc. The training criteria depend on the type and architecture of the security protocol session classifier and on the available computing resources of the security protocol session classifier trainer. If the security protocol session classifier does not satisfy the training criteria, flow proceeds to block 515. Otherwise, the operations in FIG. 5 are complete and the classifier has been trained as a session classifier.

At block 515, the session classifier trainer determines whether there is an additional batch of encrypted sessions. If there is an additional batch of encrypted sessions, flow returns to block 503. Otherwise, the operations in FIG. 5 are complete.

The flowcharts are provided to aid in understanding the illustrations and are not to be used to limit the scope of the claims. The flowcharts depict example operations that can vary within the scope of the claims. Additional operations may be performed; fewer operations may be performed; the operations may be performed in parallel; and the operations may be performed in a different order. For example, in the operation in block 317 the session verdict can be any session verdict indicating blocking. The security layer protocol at block 303 can be, alternatively, any handshake protocol. The malicious labelling criteria for the iterations at blocks 405, 407, 409, 411, 413, and 415 can be labelling criteria that categorize risk indicators as additional or alternative labels than malicious and benign labels. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platforms (operating system and/or hardware), application ecosystems, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 6:
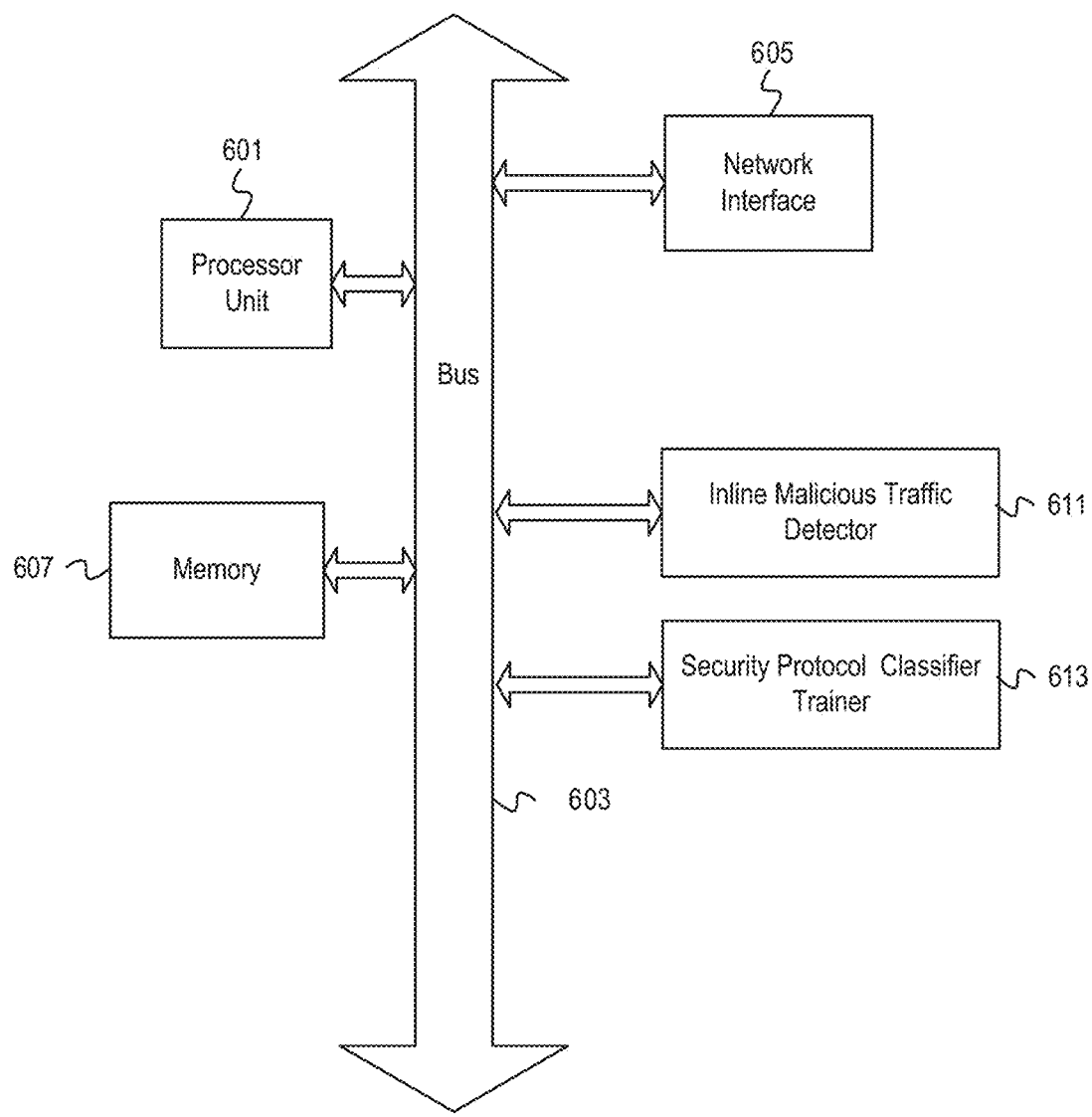
FIG. 6 depicts an example computer system with an inline malicious traffic detector and a security protocol session classifier trainer.

FIG. 6 depicts an example computer system with an inline malicious traffic detector and a security protocol session classifier trainer. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes an inline malicious traffic detector 611 and a security protocol session classifier trainer 613. The inline malicious traffic detector 611 can generate features from client-server handshake messages for a session encrypted according to a security protocol in parallel to session communications and can classify and block the encrypted session based on the generated features. The security protocol session classifier trainer 613 can generate risk indicators including flag, verdicts, and assessments for encrypted sessions using a firewall system, can generate labels for training data from the risk indicators and can train a security protocol classifier to classify encrypted sessions for the security protocol using the training data. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for training and implementation of security protocol session classifiers for classifying encrypted sessions from features in client-server handshakes and blocking encrypted sessions as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:
   during establishment of a network session according to a handshake sub-protocol of a security protocol, before completion of the handshake sub-protocol and prior to communication of encrypted application protocol traffic in the network session once the network session is established according to the handshake sub-protocol:
      capturing client-side handshake messages and server-side handshake messages communicated at a transport layer of the network session according to the handshake sub-protocol;
      extracting a plurality of features from the captured client-side handshake messages and server-side handshake messages;
      inputting the plurality of features into a network session classification model to obtain a verdict of malicious or benign behavior for the network session as an output, wherein the network session classification model classifies network sessions based, at least in part, on the plurality of features including indications of one or more domain generation algorithms (DGAs) for the client-side and the server-side handshake messages of the handshake sub-protocol in the network session; and
      blocking the encrypted application protocol traffic in the network session based, at least in part, on the output indicating that the network session is malicious.

2. The method of claim 1, wherein the plurality of features comprises at least one of protocol versions, types of cipher suites, types of destination ports, and types of digital certificates indicated by the client-side and server-side handshake messages.

3. The method of claim 1, wherein the plurality of features comprises indications of one or more domain names that were generated with the one or more DGAs in the client-side and server-side handshake messages.

4. The method of claim 1, wherein the network session classification model was trained on network sessions previously classified as malicious based, at least in part, on at least one of domain names generated with the one or more DGAs, server name indicators, and destination Internet Protocol (IP) addresses in the network sessions.

5. The method of claim 4, wherein the network sessions were previously classified as malicious based on at least one of assessments, verdicts, and flags for the network sessions.

6. The method of claim 1, wherein the client-side and server-side handshake messages that were captured comprise handshake messages used to establish a cipher suite for encryption and decryption with the security protocol.

7. The method of claim 1, further comprising communicating an alert to an endpoint for the network session indicating that the network session was blocked.

8. A non-transitory machine-readable storage medium having program code stored thereon, the program code comprising instructions that when executed by a processor cause the processor to:
   during establishment of a network session according to a handshake sub-protocol of a security protocol, before completion of the handshake sub-protocol and prior to communication of encrypted application protocol traffic in the network session once the network session is established according to the handshake sub-protocol;
   capture client-side handshake messages and server-side handshake messages communicated at a transport layer of the network session according to the handshake sub-protocol;
   extract a plurality of features from the captured client-side handshake messages and server-side handshake messages;
   input the plurality of features into a network session classification model to obtain a verdict of malicious or benign behavior for the network session as an output, wherein the network session classification model classifies network sessions based, at least in part, on the plurality of features including indications of one or more domain generation algorithms (DGAs) for the client-side and the server-side handshake messages of the handshake sub-protocol in the network session; and
   block the encrypted application protocol traffic in the network session based, at least in part, on the output indicating that the network session is malicious.

9. The non-transitory machine-readable medium of claim 8, wherein the plurality of features comprises at least one of protocol versions, types of cipher suites, types of destination ports, and types of digital certificates indicated by the client-side and server-side handshake messages.

10. The non-transitory machine-readable medium of claim 8, wherein the plurality of features comprises indications of one or more domain names that were generated with the one or more DGAs in the client-side and server-side handshake messages.

11. The non-transitory machine-readable medium of claim 8, wherein the network session classification model was trained on network sessions previously classified as malicious based, at least in part, on at least one of domain names generated with the one or more DGAs, server name indicators, and destination Internet Protocol (IP) addresses in the network sessions.

12. The non-transitory machine-readable medium of claim 11, wherein the network sessions were previously classified as malicious based on at least one of assessments, verdicts, and flags for the network sessions.

13. The non-transitory machine-readable medium of claim 8, wherein the client-side and server-side handshake messages that were captured comprise handshake messages used to establish a cipher suite for encryption and decryption with the security protocol.

14. The non-transitory machine-readable medium of claim 8, wherein the program code further comprises instructions to communicate an alert to an endpoint for the network session indicating that the network session was blocked.

15. An apparatus comprising:
a processor; and
a non-transitory machine-readable storage medium having instructions stored thereon that are executable by the processor to cause the apparatus to:
during establishment of a network session according to a handshake sub-protocol of a security protocol, before completion of the handshake sub-protocol and prior to communication of encrypted application protocol traffic in the network session once the network session is established according to the handshake sub-protocol:
capture client-side handshake messages and server-side handshake messages communicated at a transport layer of the network session according to the handshake sub-protocol;
extract a plurality of features from the captured client-side handshake messages and server-side handshake messages;
input the plurality of features into a network session classification model to obtain a verdict of malicious or benign behavior for the network session as an output, wherein the network session classification model classifies network sessions based, at least in part, on the plurality of features including indications of one or more domain generation algorithms (DGAs) for the client-side and the server-side handshake messages of the handshake sub-protocol in the network session; and
block the encrypted application protocol traffic in the network session based, at least in part, on the output indicating that the network session is malicious.

16. The apparatus of claim 15, wherein the plurality of features comprises at least one of protocol versions, types of cipher suites, types of destination ports, and types of digital certificates indicated by the client-side and server-side handshake messages.

17. The apparatus of claim 15, wherein the plurality of features comprises indications of one or more domain names that were generated with the one or more DGAs in the client-side and server-side handshake messages.

18. The apparatus of claim 15, wherein the network session classification model was trained on network sessions previously classified as malicious based, at least in part, on at least one of domain names generated with the one or more DGAs, server name indicators, and destination Internet Protocol (IP) addresses in the network sessions.

19. The apparatus of claim 18, wherein the network sessions were previously classified as malicious based on at least one of assessments, verdicts, and flags for the network sessions.

20. The apparatus of claim 18, wherein the client-side and server-side handshake messages that were captured comprise handshake messages used to establish a cipher suite for encryption and decryption with the security protocol.

* * * * *